(12) United States Patent
Munjurulimana et al.

(10) Patent No.: US 10,744,966 B2
(45) Date of Patent: Aug. 18, 2020

(54) HYBRID/COMPOSITE ENERGY-ABSORBING LOWER MEMBER FOR AUTOMOBILES AND PROCESS FOR MAKING THE SAME

(71) Applicant: SABIC Global Technologies B.V., Bergen op Zoom (NL)

(72) Inventors: Dinesh Munjurulimana, Bangalore (IN); Pavan Puranik, Bangalore (IN)

(73) Assignee: SABIC Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 16/063,076

(22) PCT Filed: Dec. 14, 2016

(86) PCT No.: PCT/IB2016/057629
§ 371 (c)(1),
(2) Date: Jun. 15, 2018

(87) PCT Pub. No.: WO2017/109647
PCT Pub. Date: Jun. 29, 2017

(65) Prior Publication Data
US 2019/0291667 A1    Sep. 26, 2019

(30) Foreign Application Priority Data
Dec. 23, 2015  (IN) ............................ 4249/DEL/2015

(51) Int. Cl.
*B60R 19/03* (2006.01)
*B60R 19/18* (2006.01)
(Continued)

(52) U.S. Cl.
CPC .............. *B60R 19/03* (2013.01); *B60R 19/02* (2013.01); *B60R 19/12* (2013.01); *B60R 19/18* (2013.01); *B60R 21/34* (2013.01)

(58) Field of Classification Search
CPC .......... B60R 19/03; B60R 19/18; B60R 21/34
(Continued)

(56) References Cited

U.S. PATENT DOCUMENTS 6,089,628 A   7/2000 Schuster
6,394,512 B1  5/2002 Schuster et al.
(Continued)

FOREIGN PATENT DOCUMENTS

EP    1300293 B1   12/2004
EP    1604869 B1   10/2007
(Continued)

OTHER PUBLICATIONS

Machine translation of JP 2002-205613 (A) (Year: 2002).*
(Continued)

*Primary Examiner* — Hilary L Gutman
(74) *Attorney, Agent, or Firm* — Baker Hostetler

(57) ABSTRACT

A lower member device (420) and a method of constructing a lower member device includes arranging a metallic/composite (602) component in preparation for molding a plastic portion such that the metallic/composite component will extend along a width of the plastic portion. The lower member device and method further including configuring the metallic/composite component to attach to a front end module of a vehicle with attachment portions 606, molding the plastic portion over the metallic/composite component, and forming strengthening portions arranged adjacent the metallic/composite component in the plastic portion during molding.

33 Claims, 16 Drawing Sheets

(51) Int. Cl.
*B60R 21/34* (2011.01)
*B60R 19/12* (2006.01)
*B60R 19/02* (2006.01)

(58) Field of Classification Search
USPC ...................................................... 293/120
See application file for complete search history.

(56) References Cited

U.S. PATENT DOCUMENTS

| | | | |
|---|---|---|---|
| 6,513,843 B1 | 2/2003 | Frederick et al. |
| 6,540,275 B1 | 4/2003 | Iwamoto et al. |
| 6,659,520 B2 | 12/2003 | Bastien et al. |
| 6,663,151 B2 | 12/2003 | Mansoor et al. |
| 6,726,260 B1 | 4/2004 | Wang et al. |
| 6,755,452 B2 | 6/2004 | Cate et al. |
| 6,755,459 B2 | 6/2004 | Thelen et al. |
| 6,832,795 B2 | 12/2004 | Bastien et al. |
| 7,013,951 B2 | 3/2006 | Bauer et al. |
| 7,163,243 B2 | 1/2007 | Evans |
| 7,296,833 B2 | 11/2007 | Mohapatra et al. |
| 7,434,872 B2 | 10/2008 | Steller |
| 8,042,847 B2 | 10/2011 | Garg et al. |
| 8,132,851 B2 | 3/2012 | Steller et al. |
| 8,328,251 B2 | 12/2012 | Nagwanshi et al. |
| 8,449,021 B2 | 5/2013 | Mana et al. |
| 2004/0160071 A1 | 8/2004 | Suganuma et al. |
| 2011/0001325 A1 | 1/2011 | Bernt et al. |

FOREIGN PATENT DOCUMENTS

| | | |
|---|---|---|
| GB | 2387215 A | 10/2003 |
| JP | 2002-205613 A | 7/2002 |
| WO | WO 2015/153547 A1 | 10/2015 |

OTHER PUBLICATIONS

JP 2002205613 machine translation (Year: 2002).*
International Patent Application No. PCT/IB2016/057629; Int'l Search Report and the Written Opinion; dated Apr. 11, 2017; 19 pages.
International Patent Application No. PCT/IB2016/057629; Int'l Preliminary Report on Patentability; dated Jul. 5, 2018; 13 pages.

\* cited by examiner

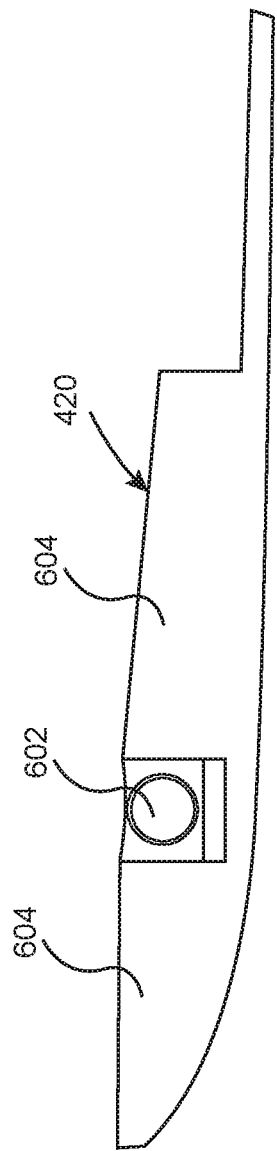
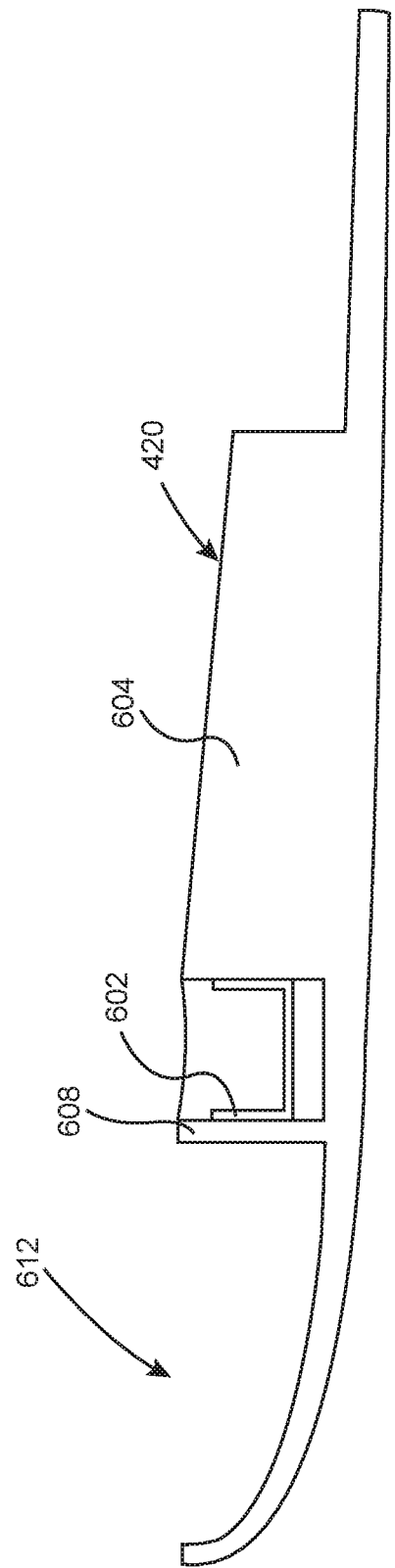
FIG. 8A
FIG. 8B

HYBRID/COMPOSITE ENERGY-ABSORBING LOWER MEMBER FOR AUTOMOBILES AND PROCESS FOR MAKING THE SAME

CROSS-REFERENCE TO RELATED APPLICATION

This application is the National Stage of International Application No. PCT/IB2016/057629, filed Dec. 14, 2016, which claims the benefit of Indian Patent Application No. 4249/DEL/2015 filed Dec. 23, 2015, the disclosures of which are incorporated herein by this reference in their entireties.

BACKGROUND OF THE DISCLOSURE

1. Field of the Disclosure

This disclosure is directed to a hybrid/composite energy-absorbing lower member for vehicles. Moreover, the disclosure is directed to a method of making a hybrid/composite energy-absorbing lower member for vehicles.

2. Related Art

Efforts are being made throughout the world to improve safety features of vehicles by regulatory bodies by bringing in new safety standards. Original equipment manufacturers (OEMs) across the globe are working towards meeting these stringent requirements. However, meeting such stringent requirements along with a desire to reduce weight of the vehicle is challenging because of the inherent vehicle architecture. Pedestrian safety is one of the most important criteria for the OEMs and the regulatory bodies. Accident research data from several countries across the globe shows that the leg (both lower leg and upper leg) and the head are major parts of a pedestrian that are involved during a vehicle to pedestrian impact. Therefore, most of the regulatory requirements on pedestrian safety are directed to the legform impact and headform impact. A lower legform impact to a vehicle calls for maintaining three parameters (knee acceleration, knee bending and shear) within a prescribed value. A lower member, such as a stiffener, a spoiler, an undertray and the like, present in a vehicle plays a crucial role in controlling lower legform impact such as knee bending.

Architecture of a lower member for a vehicle can be generally categorized into two different constructions. In the first, a lower steel spoiler is mounted at two ends, and in the second one an all plastic lower-spoiler/undertray is mounted across a lower portion of front end module at numerous locations. The architectures of the lower member of conventional pedestrian friendly vehicles are shown in FIG. 1 and FIG. 2. In this regard, the existing solutions of a lower member are either made of metal or plastic.

FIG. 1 shows a conventional metal spoiler 2 of a front-end module 1 connected either to metallic brackets 4 or to two relatively stiff structures where the metal spoiler 2 is used as a lower-leg protector. The undertray typically gets support only from two ends in these vehicles through connections 3. On the other hand, FIG. 2 shows a conventional front-end module 10 having a plastic undertray 12 mounted at numerous locations 13 across the lower portion of the front end module 10. A solution using the typical plastic undertray 12 requires multiple mounting locations 13 on the front end module 10 in an attempt to meet the necessary regulatory requirements for pedestrian safety. These numerous mounting locations increase manufacturing complexity and time, increase costs, and so on. However, it is observed that the performance of the plastic undertray 12 reduces significantly if the mounting locations are reduced. For example, reduced to two mounting locations (Extreme ends).

The lower-leg impact performance (mainly the knee bending) of a vehicle with a plastic undertray 12 on these kinds of vehicles is shown in FIG. 3. As can be observed, the knee bending in the case of a pure plastic undertray 12 is significantly undesirably negatively greater than that observed using a metallic spoiler 2. Therefore, the performance of a pure plastic undertray 10 system is not satisfactory although it provides a significant weight reduction. Moreover, the pure plastic undertray 10 requires complex manufacturing due to the plurality of attachments across the front end module. The steel spoiler solution has more satisfactory pedestrian safety performance. However, the steel spoiler solution results in greater weight, increased cost and complex manufacturing through a need to have supporting plates/brackets and the like, which are separately stamped, manufactured and assembled together by welding/fasteners and the like.

Accordingly, an energy-absorbing lower member for automobiles having simplified manufacturing, simplified construction, improved pedestrian safety, and reduced weight is desired.

SUMMARY OF THE DISCLOSURE

A hybrid lower member with plastics over molded on metallic/composite tubes or metallic/composite channels with standard sections (circular, rectangular, etc.) may be used to meet the requirements for a front end module vehicle architecture. By doing so, the extra under shield which may be a part of a bumper fascia, can be simplified and the entire system weight can be reduced without compromising pedestrian safety performance of the system.

According to an aspect of the disclosure, a lower member device includes a metallic/composite component extending substantially along a width of a plastic portion, the metallic/composite component including attachment portions configured to attach to a front end module of a vehicle, the plastic portion being over molded on the metallic/composite component, and the plastic portion further includes strengthening portions arranged adjacent the metallic/composite component.

According to an aspect of the disclosure, a method of constructing a lower member device includes arranging a metallic/composite component in preparation for molding a plastic portion such that the metallic/composite component will extend along a width of the plastic portion, configuring the metallic/composite component to attach to a front end module of a vehicle with attachment portions, molding the plastic portion over the metallic/composite component, and forming strengthening portions arranged adjacent the metallic/composite component in the plastic portion during molding.

Additional features, advantages, and aspects of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate aspects of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings:

FIG. 8A and FIG. 8B show various cross-sections of a lower member according to other aspects of the disclosure.

DETAILED DESCRIPTION OF THE DISCLOSURE

Figure 1:
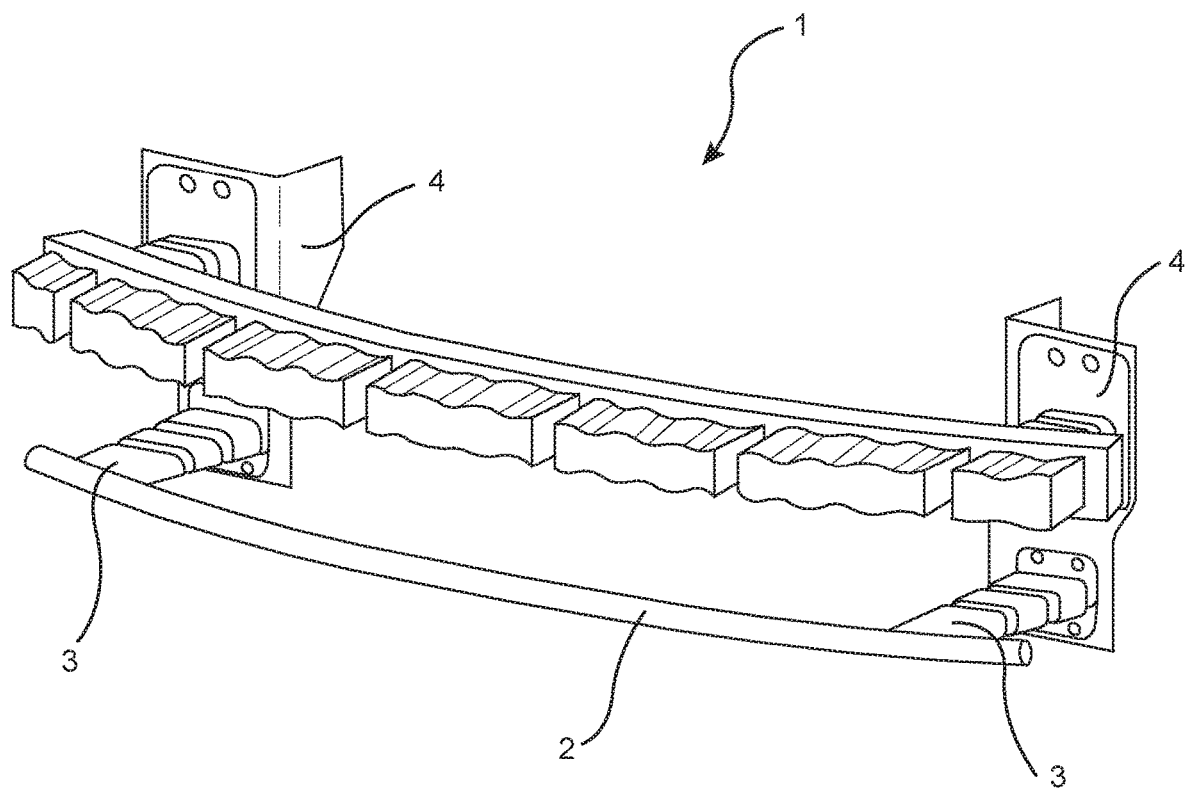
FIG. 1 shows a conventional metallic spoiler of a front end module of a vehicle.
Figure 2:
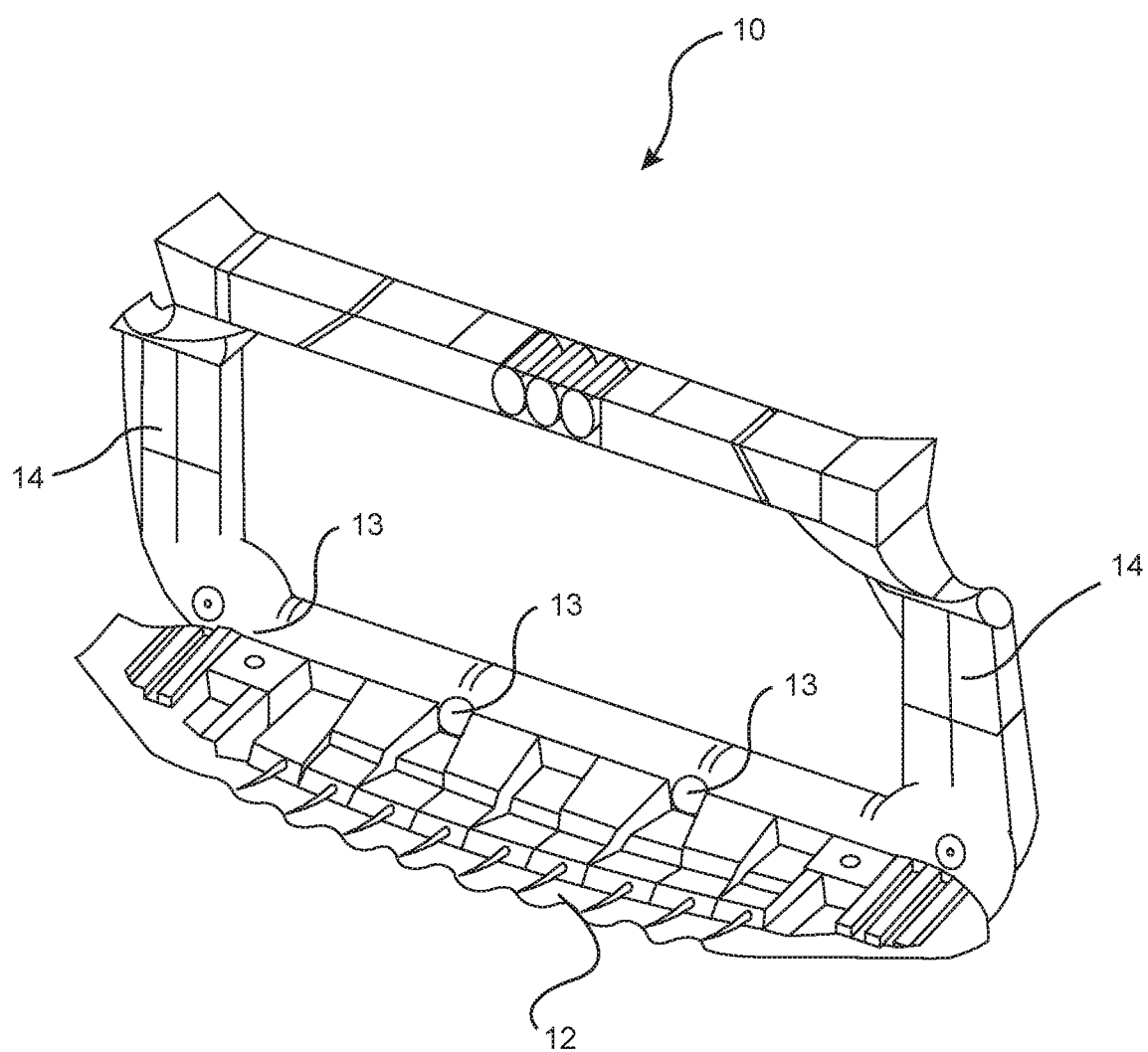
FIG. 2 shows conventional plastic undertray of a front-end module of a vehicle.

The aspects of the disclosure and the various features and advantageous details thereof are explained more fully with reference to the non-limiting aspects and examples that are described and/or illustrated in the accompanying drawings and detailed in the following description. It should be noted that the features illustrated in the drawings are not necessarily drawn to scale, and features of one aspect may be employed with other aspects as the skilled artisan would recognize, even if not explicitly stated herein. Descriptions of well-known components and processing techniques may be omitted so as to not unnecessarily obscure the aspects of the disclosure. The examples used herein are intended merely to facilitate an understanding of ways in which the disclosure may be practiced and to further enable those of skill in the art to practice the aspects of the disclosure. Accordingly, the examples and aspects herein should not be construed as limiting the scope of the disclosure, which is defined solely by the appended claims and applicable law. Moreover, it is noted that like reference numerals represent similar parts throughout the several views of the drawings.

One aspect of the disclosure is to provide a lower member energy-absorbing system at the front portion of the vehicle with plastic over molded on metallic or composite channels or tubes. Another aspect of the disclosure is to provide a design of a hybrid/metal plastic/composite energy-absorbing lower member whose metallic/composite member is mounted to the end supports of the lower portion of the vehicle using standard fastening elements such as clips, bolts, rivets etc.

To reduce the weight of the system without compromising the performance of the system, a hybrid/composite solution as set forth in the disclosure is proposed to replace the existing metal solution. It is worth noting that the lower portion of the fascia, which is typically known as an undercover or a guard, can be removed, and the metal plastic/composite lower member can serve the function of a lower stiffener, spoiler and/or an underguard. The metallic/composite part may be constructed utilizing a readily available metallic/composite pipe with a circular or a rectangular cross section resulting in reduced manufacturing costs and simplified construction. A fastener, such as a C-section metal clamp, may be used to mount the hybrid/composite lower member to an upper cross member of a vehicle. This metal pipe/standard shape metal component or composite channel may then be over molded with plastic to bear the load. This hybrid/composite lower member meets the regulatory requirements as evidenced by numerous tests discussed below. Moreover, the hybrid/composite lower member results in a significant weight savings. Hence, the hybrid/composite lower member reducing the weight of the system without compromising the regulatory safety requirements.

Figure 4:
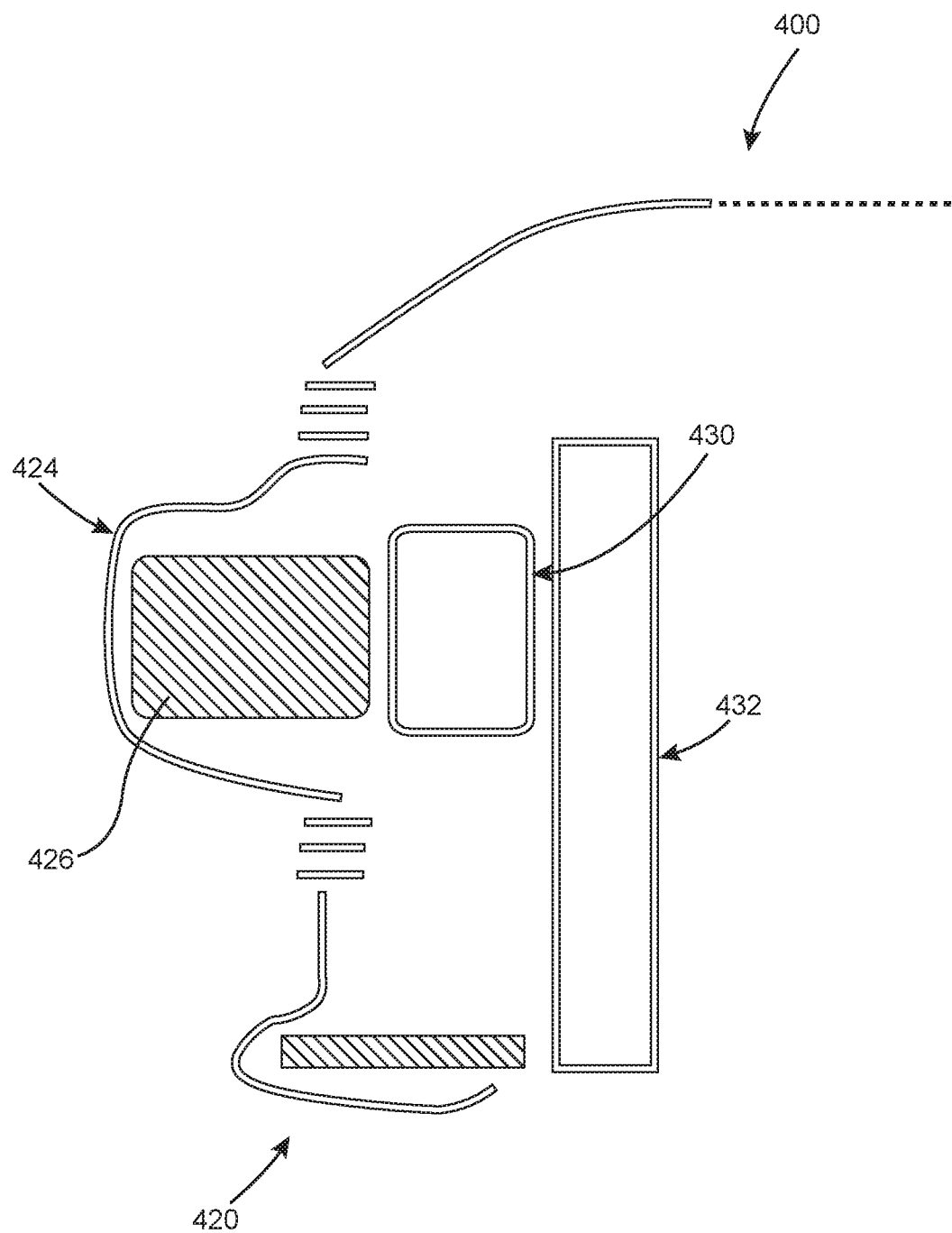
FIG. 4 illustrates components of a front end of a vehicle.

FIG. 4 illustrates components of a front end of a vehicle. In particular, FIG. 4 is a partial cross-sectional view of one aspect of a front end of a vehicle 400 including a bumper beam 430, an energy absorber (EA) 426, a fascia 424, a hood, a radiator 432, and a lower member 420. Of course, the front of the vehicle 400 may include many additional components. However, these additional components are not shown to simplify illustration.

Figure 5:
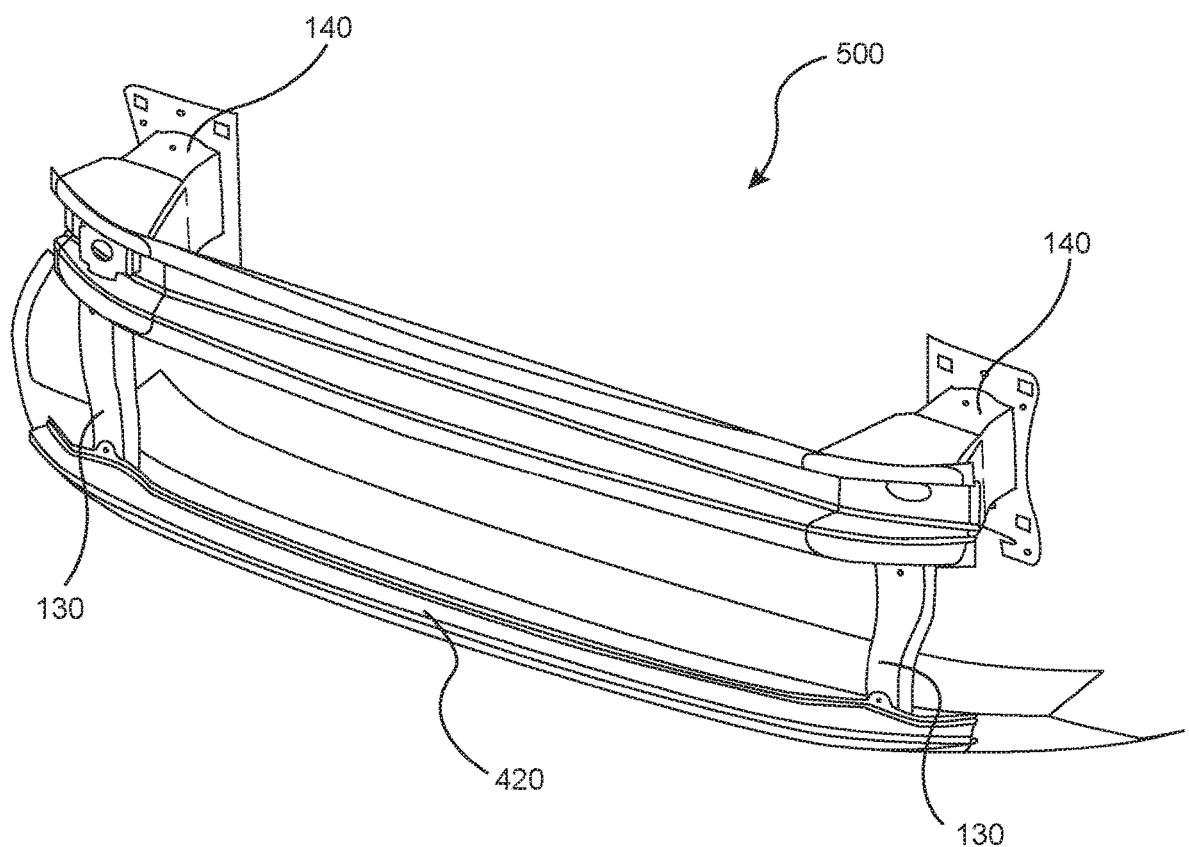
FIG. 5 illustrates a construction of a front end module according to an aspect of the disclosure.

FIG. 5 illustrates the construction of a front end module according to an aspect of the disclosure. In particular, FIG. 5 shows some components of the front end module 500 including the lower member 420 and attachments 130 that are configured to attach the lower member 420 to the front end module 500. The front end module 500 may further include brackets 140 that are configured to attach the front end module 500 to a frame (not shown) of the vehicle 400. Although a particular construction is shown in FIG. 5, other constructions are contemplated as well. In a particular aspect, the lower member 420 is constructed such that two attachments 130 are utilized in order to provide attachment of the lower member 420 to the front end module 500 and provide satisfactory pedestrian safety impact performance as described below. Utilizing a construction having two attachments 130 simplifies construction, reduces manufacturing time, reduces parts count, and the like.

The front end module 500 may be associated with the vehicle 400 of FIG. 4 and may further include the bumper beam 430, the energy absorber (EA) 426, the fascia 424, the hood, and the radiator 432. The vehicle 400 may further include numerous other components that are not illustrated including an engine, an engine compartment, transmission, ground engaging members such as wheels and tires, exhaust system, fuel system, and the like.

Figure 6:
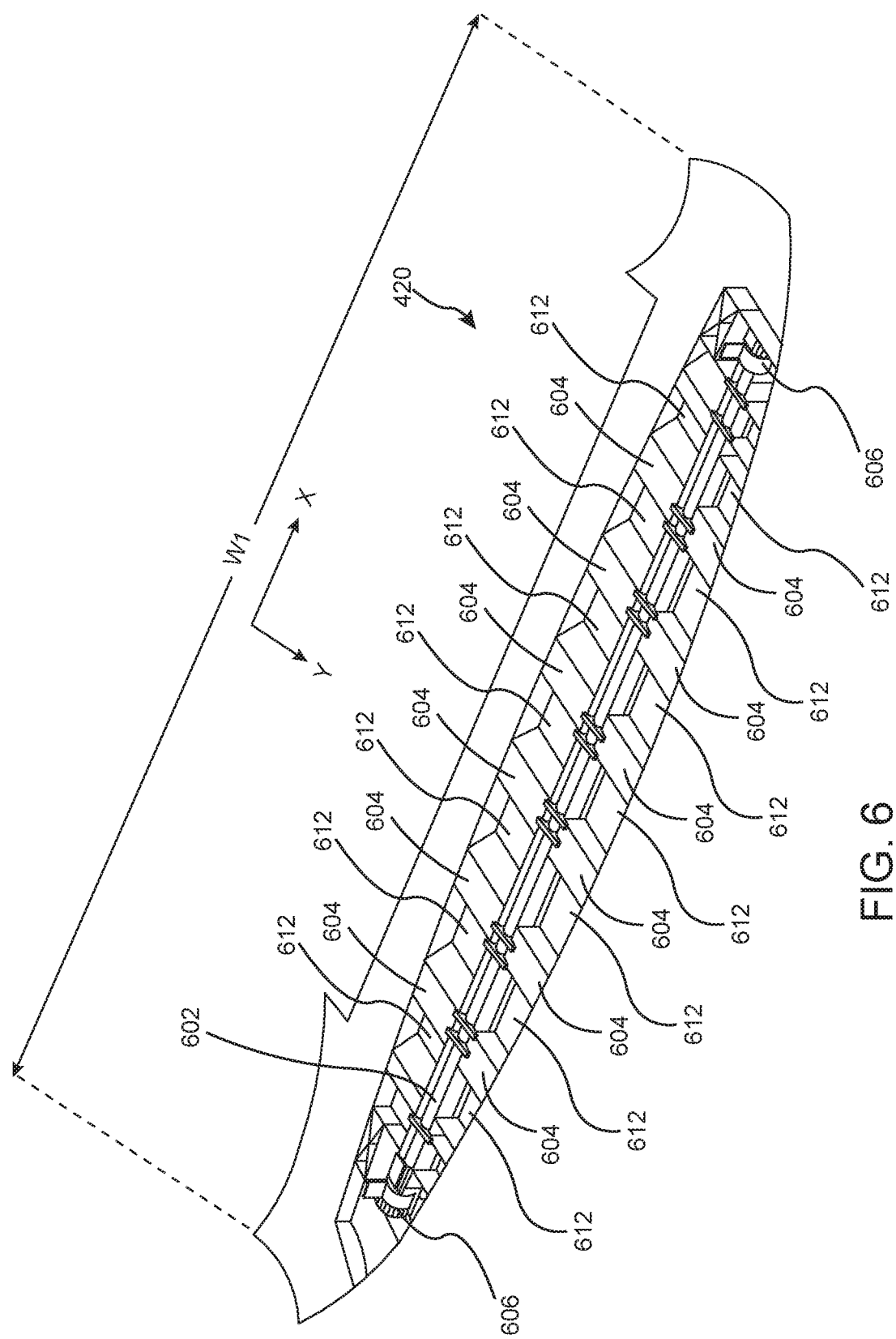
FIG. 6 illustrates a construction of a lower member according to an aspect of the disclosure.

FIG. 6 illustrates the construction of a lower member according to an aspect of the disclosure. In particular, FIG. 6 illustrates a backside of the lower member 420. The lower member 420 may include a metallic/composite component 602 extending generally horizontally along a width of the lower member 420 from one end to another end (along the X axis). However, in some aspects as shown in FIG. 6, the metallic/composite component 602 may not extend to the very ends of the lower member 420. In those aspects, the metallic/composite component 602 may only extend horizontally to a location of the fasteners 606. In other aspects, the metallic/composite component 602 may extend horizontally to a location just past the fasteners 606 and not extend to the very ends of the lower member 420. The ends of the metallic/composite component 602 adjacent a location of the fasteners 606 may form attachment portions.

The metallic/composite component 602 may be arranged at any height position in the lower member 420 (the height extending along the Y axis). The metallic/composite component 602 may be steel, aluminum, titanium, glass filed or carbon composite and the like.

The metallic/composite component 602 may be over molded into the construction of the lower member 420. In one aspect, the lower member 420 may fully surround the metallic/composite component 602. In another aspect, the lower member 420 may partially surround the metallic/composite component 602. In another aspect, the lower member 420 may surround the metallic/composite component 602 such that an upper surface of the metallic/composite component 602 is exposed. In another aspect, the lower member 420 may surround the metallic/composite component 602 such that only the ends of the metallic/composite component 602 are exposed adjacent the fasteners 606. In another aspect, the lower member 420 may surround the metallic/composite component 602 such that only a portion of the attachment portions of the metallic/composite component 602 are exposed adjacent the fasteners 606. In another aspect, the lower member 420 may partially surround the metallic/composite component 602 such that the attachment portions of the metallic/composite component 602 are exposed adjacent the fasteners 606.

The lower member 420 may be further molded with a plurality of strengthening structures 604. The strengthening structures 604 may be ribs, areas of greater thickness, and the like. The strengthening structures 604 may be a solid portion, a foamed portion, a hollow portion, and the like. The strengthening structures 604 may be combinations of the same. In some aspects, the strengthening structures 604 may include rectangular cross-section portions. In other aspects, the strengthening structures 604 may include trapezoidal cross-section portions. In some aspects, the strengthening structures 604 may include other polygonal and non-polygonal cross-section portions as needed to provide the required and/or desired strength of the lower member 420. The strengthening structures 604 may be adjacent, encase, and/or cover the metallic/composite component 602.

Additionally, the lower member 420 may include a smooth exposed paintable outer surface (not shown). The lower member 420 may further include open sections 612 between the strengthening structures 604 to reduce weight of the lower member 420. The construction of the metallic/composite component 602 is described in further detail below.

Once the lower member 420 is constructed, the lower member 420 may be installed on the vehicle 400, below the bumper beam 430. The outer surface of the lower member 420 may form a lower portion of the fascia 424. Alternatively, the lower member 420 may be separately covered by the fascia 424.

Figure 7:
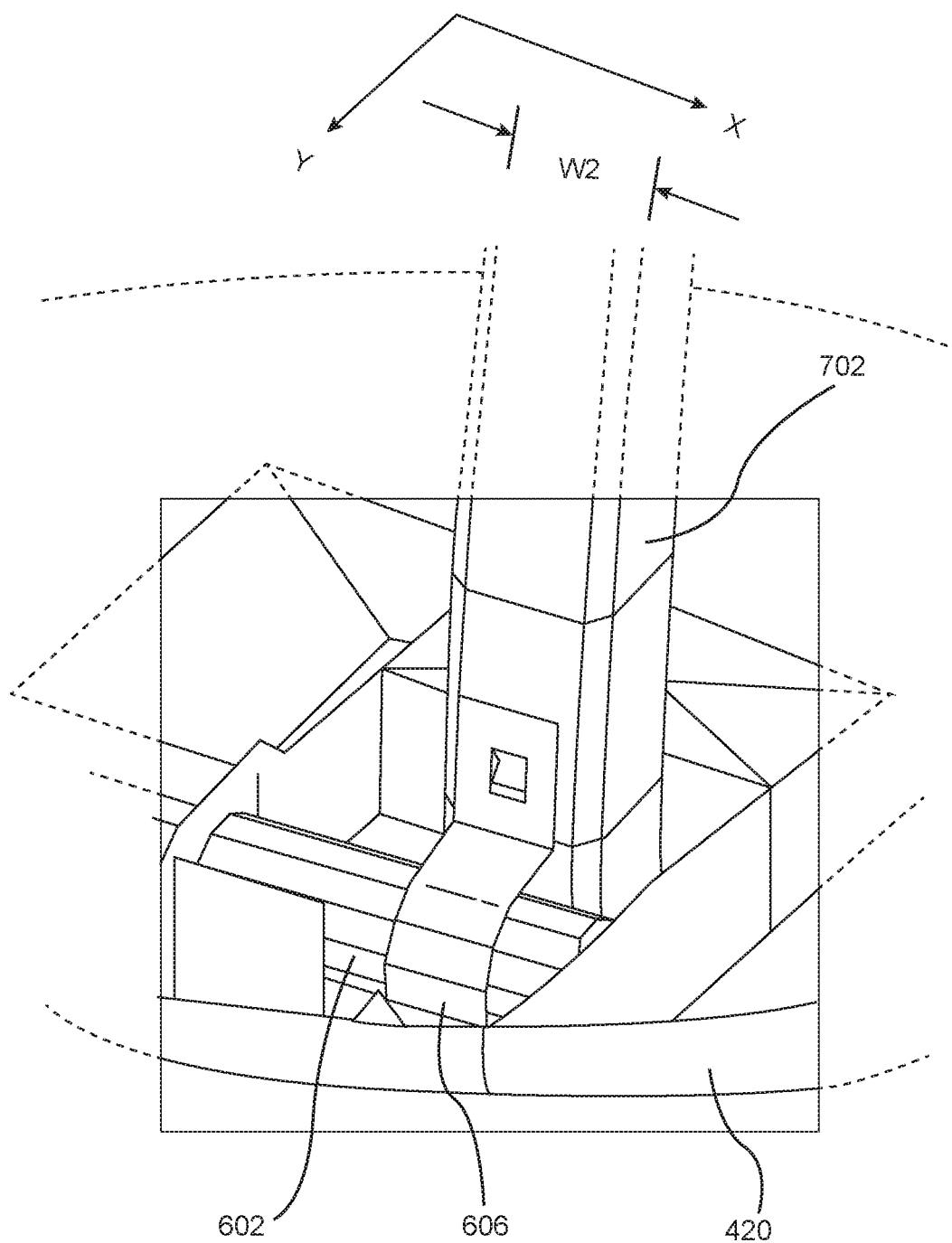
FIG. 7 illustrates a partial construction of a lower member and the connections to a vehicle according to an aspect of the disclosure.

FIG. 7 illustrates a partial construction of a lower member and the connections to a vehicle according to an aspect of the disclosure. In particular, the lower member 420 may be fastened directly to end supports 702 that may extend from the vehicle 400 and/or from the front end module 500. More specifically, the end supports 702 may be fastened to the metallic/composite component 602 with fasteners 606. The fasteners 606 may be bolts, rivets, screws, clamps, and the like. In the aspect shown in FIG. 7, the fastener may be implemented as a C clamp that provides a rigid connection and also provides an efficient and rapid manufacturing approach.

As shown in FIG. 7, in one aspect the metallic/composite component 602 may be exposed or not covered by the lower member 420 at the ends (along the X axis) of the metallic/composite component 602 at the attachment portions. This construction of the lower member 420 may allow the end supports 702 to readily connect to the metallic/composite component 602.

As further shown in FIG. 7, in one aspect the end supports 702 may have a particular width W2 along the X axis; and as shown in FIG. 6, the lower member 420 may have a width W1 along the X axis. The width W2 of the end supports 702 may be 5%-25% of the width W1 of the lower member 420.

FIG. 8A and FIG. 8B show various cross-sections of a lower member according to other aspects of the disclosure. In particular, FIG. 8A shows the metallic/composite component 602 configured as a circular metallic/composite pipe arranged in a channel of the lower member 420. During manufacturing, the plastic portion of the lower member 420 is over molded around the metallic/composite component 602 configured as a circular metallic/composite pipe. As shown in FIG. 8A, the lower member 420 may further include one or more strengthening structures 604 to provide additional strength to the lower member 420.

In another aspect, FIG. 8B shows the metallic/composite component 602 configured as a metallic/composite channel arranged in a channel of the lower member 420. During manufacturing, the plastic portion of the lower member 420 is over molded around the metallic/composite component 602 configured at a metallic/composite channel. As shown in FIG. 8B, the lower member 420 may further include a strengthening structure 604 to provide additional strength to the lower member 420. The lower member 420 may further include an open section 612 to reduce weight of the lower member 420. Additionally, the lower member 420 may further include a rib structure 608 to provide additional strength to the lower member 420.

Figure 3:
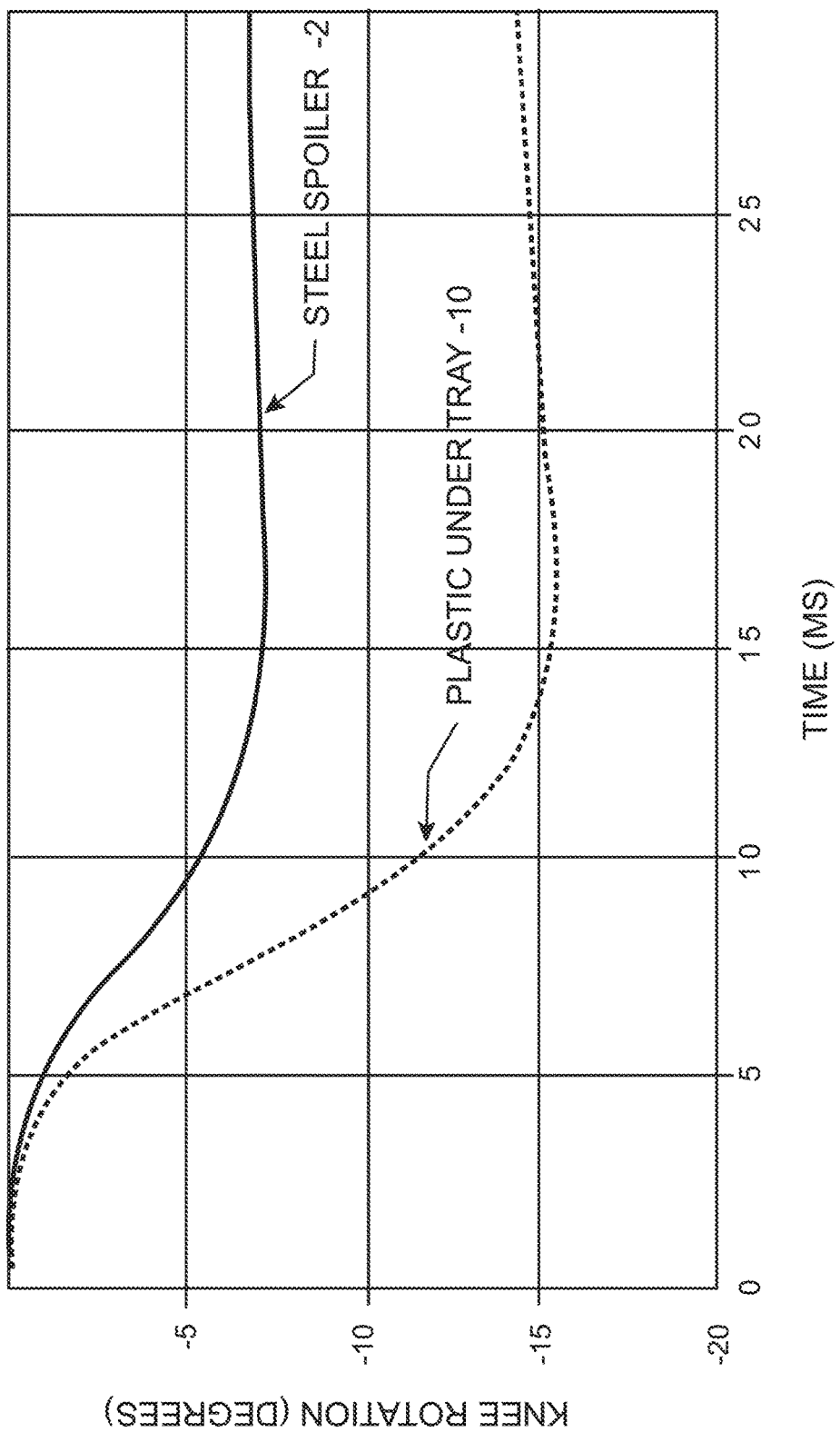
FIG. 3 shows pedestrian safety impact performance for the conventional metallic spoiler and the conventional plastic undertray.
Figure 9:
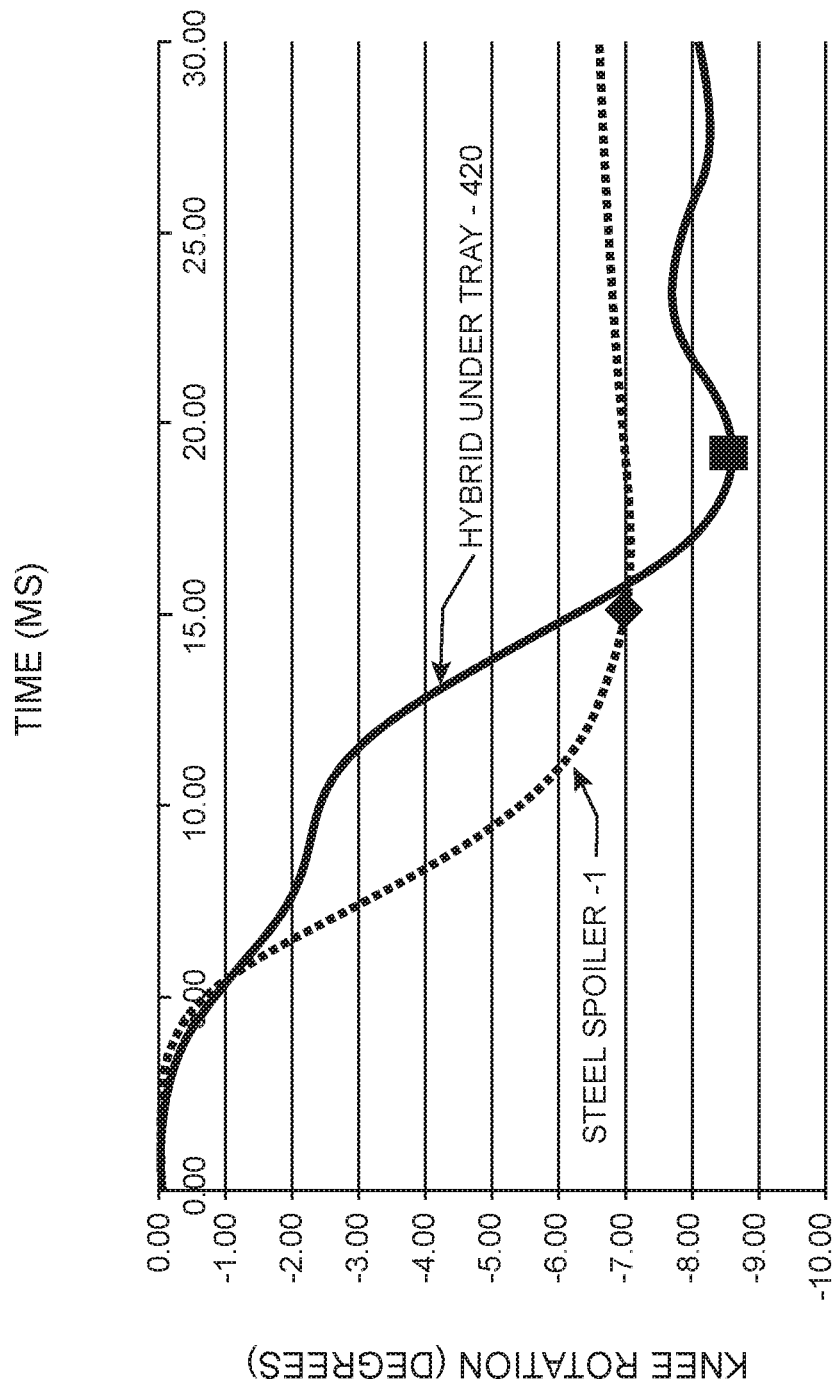
FIG. 9 shows pedestrian safety impact performance for a conventional metallic spoiler and the lower member according to the disclosure.

FIG. 9 shows pedestrian safety impact performance for a conventional metallic/composite spoiler and the lower member according to the disclosure. As shown in FIG. 9, the lower member 420 provides superior performance in pedestrian vehicle impacts from 5 to 15 ms (milliseconds) in comparison to a conventional steel spoiler (consisting essentially of the same components, but formed form steel) with respect to knee rotation. Otherwise the lower member 420 provides comparable performance in pedestrian vehicle impacts with respect to the conventional steel spoiler with respect to knee rotation. Accordingly, the lower member 420 also provides superior performance in pedestrian vehicle impacts during all time frames in comparison to a conventional plastic undertray with respect to knee rotation with reference to FIG. 3. Moreover, the lower member 420 should provide commensurate superior performance in all types of pedestrian to vehicle impacts in comparison to the conventional steel spoiler and the conventional plastic undertray.

Figure 10A:
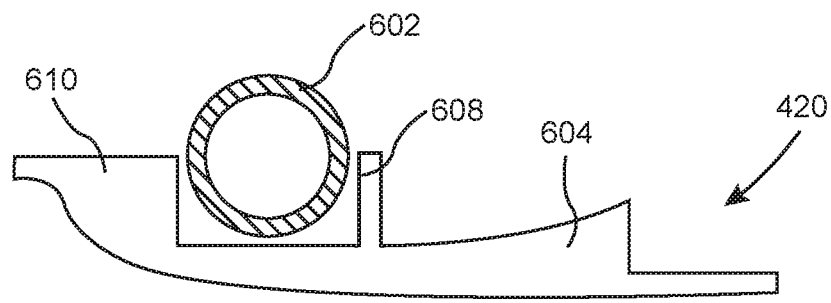
FIG. 10A, FIG. 10B, FIG. 10C, FIG. 10D, and FIG. 10E show various cross-sections of a lower member according to other aspects of the disclosure.

FIG. 10A, FIG. 10B, FIG. 10C, FIG. 10D, and FIG. 10E show various cross-sections of a lower member according to other aspects of the disclosure. In particular, FIG. 10A shows another aspect with the metallic/composite component 602 configured as a circular metallic/composite pipe arranged in a channel of the lower member 420. During manufacturing, the plastic portion of the lower member 420 is over molded around the metallic/composite component 602 configured as a circular metallic/composite pipe. As shown in FIG. 10A, the lower member 420 may further include a strengthening structure 604 to provide additional strength to the lower member 420. Furthermore, the lower member 420 may further include a rib structure 608 to provide additional strength to the lower member 420. Additionally, the lower member 420 may further include an additional area of thickness 610 to provide additional strength to the lower member 420.

Figure 10B:
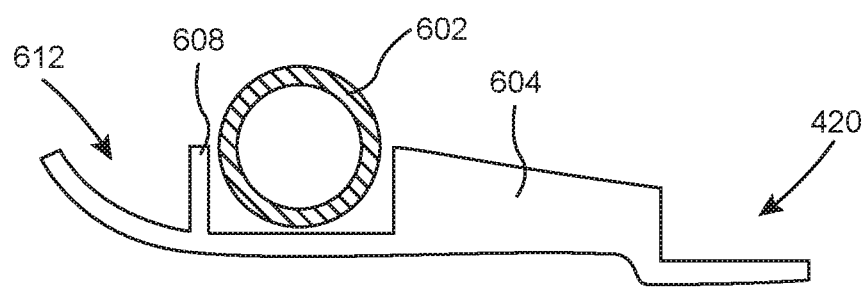
Figure 10C:
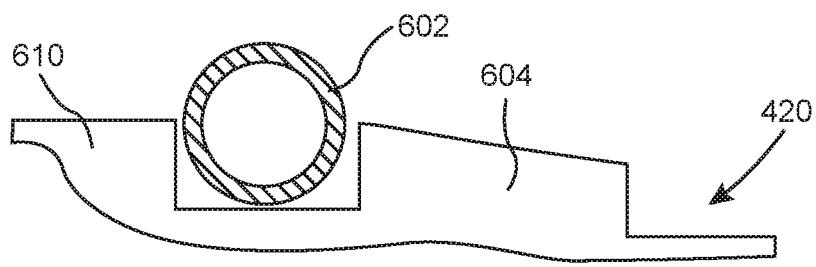

FIG. 10B shows another aspect with the metallic/composite component 602 configured as a circular metallic/composite pipe arranged in a channel of the lower member 420 with the rib structure 608 and an open section 612. FIG. 10C shows another aspect with the metallic/composite component 602 configured as a circular metallic/composite pipe arranged in a channel of the lower member 420. As shown in FIG. 10C, the lower member 420 may further include a strengthening structure 604 to provide additional strength to the lower member 420.

Figure 10D:
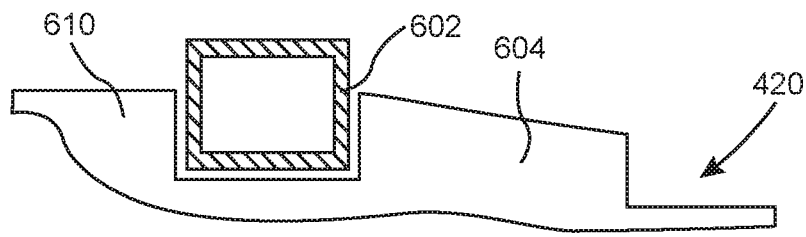
Figure 10E:
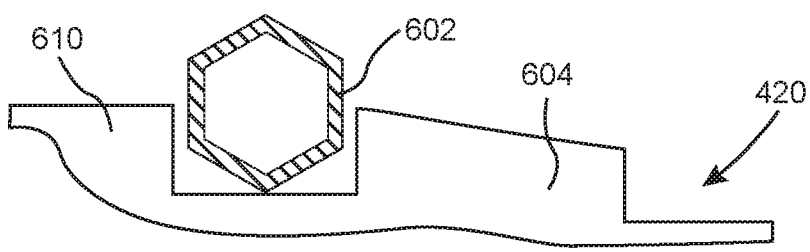

FIG. 10D shows another aspect with the metallic/composite component 602 configured as a rectangular metallic/composite pipe arranged in a channel of the lower member 420. FIG. 10E shows another aspect with the metallic/composite component 602 configured as a hexagon shaped metallic/composite pipe arranged in a channel of the lower member 420.

Figure 11A:
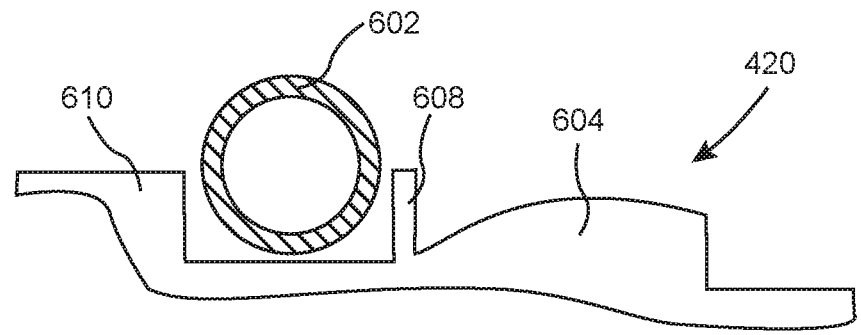
FIG. 11A, FIG. 11B, FIG. 11C, FIG. 11D, and FIG. 11E show various cross-sections of a lower member according to other aspects of the disclosure.

FIG. 11A, FIG. 11B, FIG. 11C, FIG. 11D, and FIG. 11E show various cross-sections of a lower member according to other aspects of the disclosure. In particular, FIG. 11A shows another aspect with the metallic/composite component 602 configured as a circular metallic/composite pipe arranged in a channel of the lower member 420. During manufacturing, the plastic portion of the lower member 420 is over molded around the metallic/composite component 602 configured as a circular metallic/composite pipe. As further shown in FIG. 11A, the lower member 420 may further include a strengthening structure 604 to provide additional strength to the lower member 420. Furthermore, the lower member 420 may further include a rib structure 608 to provide additional strength to the lower member 420. Moreover, the lower member 420 may further include an additional area of thickness 610 to provide additional strength to the lower member 420.

Figure 11B:
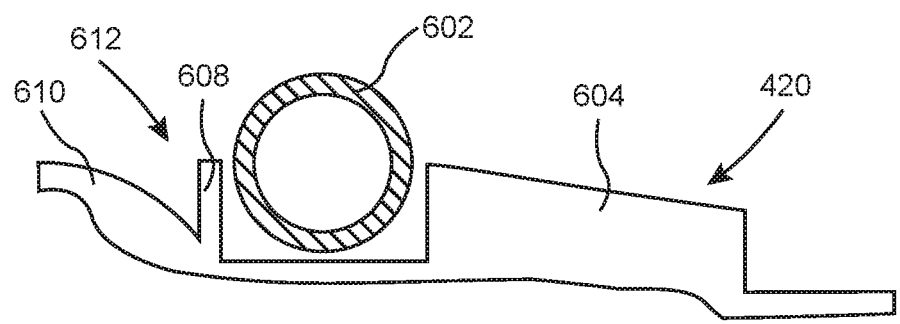
Figure 11C:
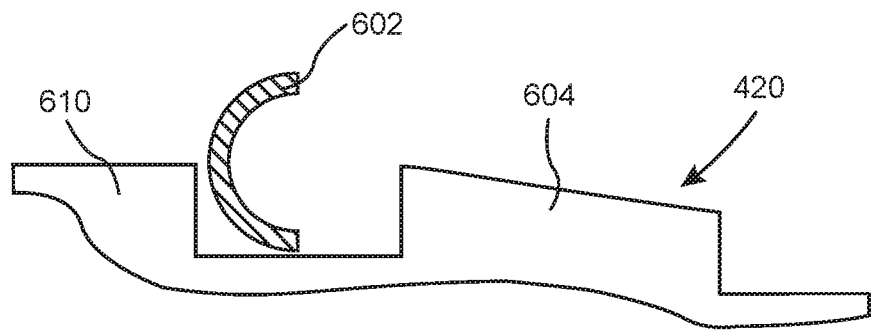
Figure 11D:
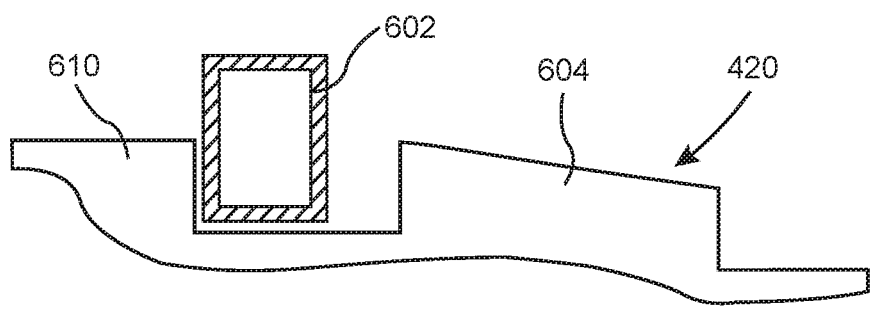
Figure 11E:
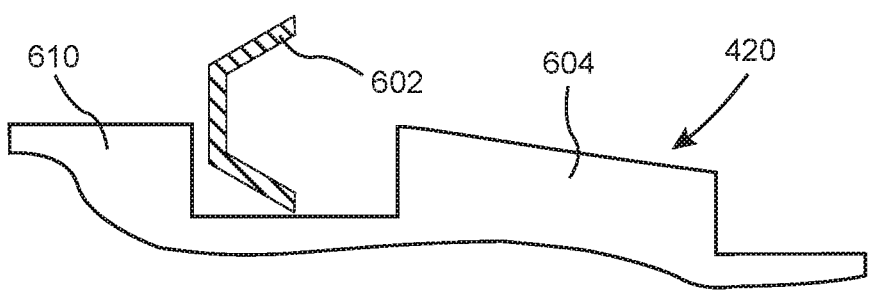

FIG. 11B shows another aspect with the metallic/composite component 602 configured as a circular metallic/composite pipe arranged in a channel of the lower member 420 having a rib structure 608. FIG. 11C shows another aspect with the metallic/composite component 602 configured as a half circular metallic/composite pipe arranged in a channel of the lower member 420. FIG. 11D shows another aspect with the metallic/composite component 602 configured as a rectangular shaped metallic/composite pipe arranged in a channel of the lower member 420. FIG. 11E shows another aspect with the metallic/composite component 602 configured as a metallic/composite flared channel arranged in a channel of the lower member 420.

Figure 12A:
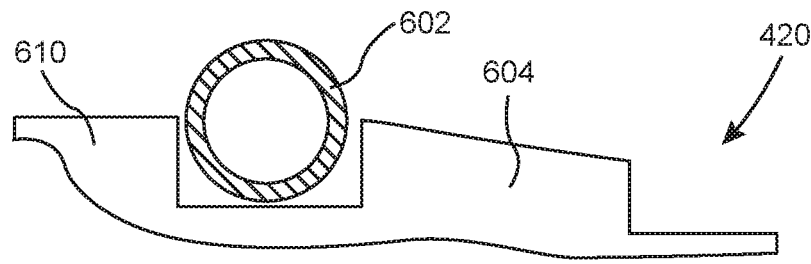
FIG. 12A, FIG. 12B, FIG. 12C, and FIG. 12D show various cross-sections of a lower member according to other aspects of the disclosure.

FIG. 12A, FIG. 12B, FIG. 12C, and FIG. 12D show various cross-sections of a lower member according to other aspects of the disclosure. In particular, FIG. 12A shows another aspect with the metallic/composite component 602 configured as a circular metallic/composite pipe arranged in a channel of the lower member 420. During manufacturing, the plastic portion of the lower member 420 is over molded around the metallic/composite component 602 configured as a circular metallic/composite pipe. As further shown in FIG. 12A, the lower member 420 may further include a strengthening structure 604 to provide additional strength to the lower member 420. Moreover, the lower member 420 may further include an additional area of thickness 610 to provide additional strength to the lower member 420.

Figure 12B:
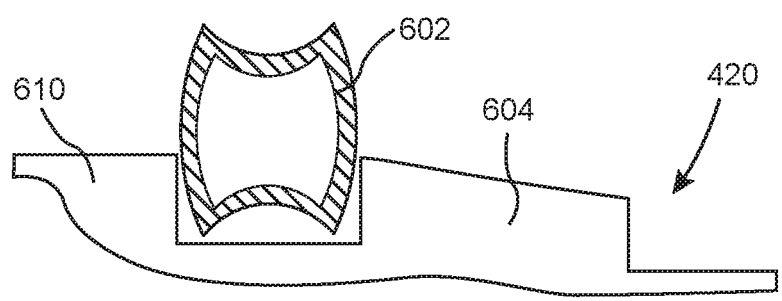
Figure 12C:
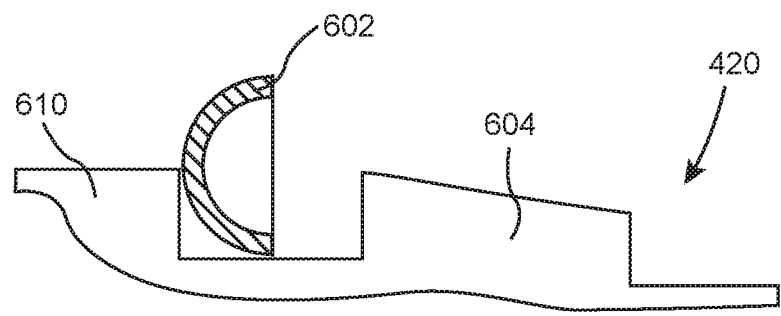
Figure 12D:
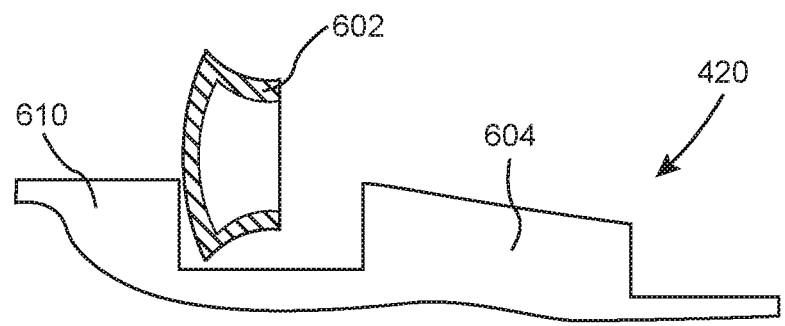

FIG. 12B shows another aspect with the metallic/composite component 602 configured as a curved side metallic/composite square arranged in a channel of the lower member 420. FIG. 12C shows another aspect with the metallic/composite component 602 configured as a half circular metallic/composite pipe arranged in a channel of the lower member 420. FIG. 12D shows another aspect with the metallic/composite component 602 configured as a curved side metallic/composite channel arranged in a channel of the lower member 420.

Figure 13A:
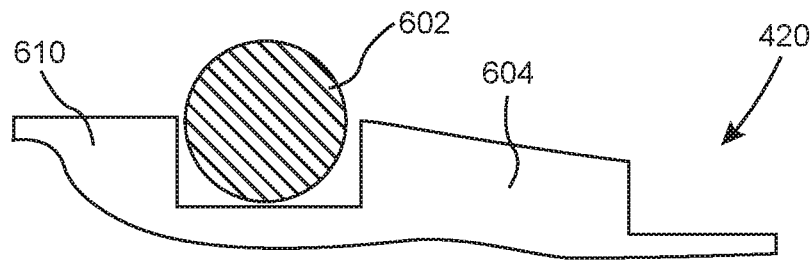
FIG. 13A, FIG. 13B, FIG. 13C, FIG. 13D, and FIG. 13E show various cross-sections of a lower member according to other aspects of the disclosure.

FIG. 13A, FIG. 13B, FIG. 13C, FIG. 13D, and FIG. 13E show various cross-sections of a lower member according to other aspects of the disclosure. In particular, FIG. 13A shows another aspect with the metallic/composite component 602 configured as a circular metallic/composite rod arranged in a channel of the lower member 420. In various aspects of the disclosure, a metallic/composite rod is configured with a solid metallic/composite construction. During manufacturing, the plastic portion of the lower member 420 is over molded around the metallic/composite component 602 configured as a circular metallic/composite rod. As further shown in FIG. 13A, the lower member 420 may further include a strengthening structure 604 to provide additional strength to the lower member 420. Moreover, the lower member 420 may further include an additional area of thickness 610 to provide additional strength to the lower member 420.

Figure 13B:
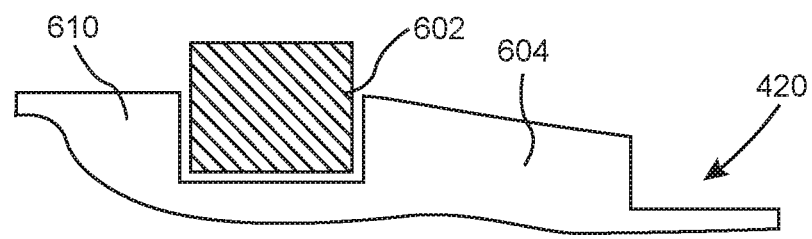
Figure 13C:
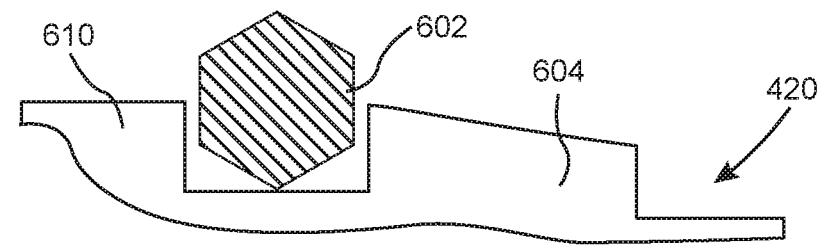
Figure 13D:
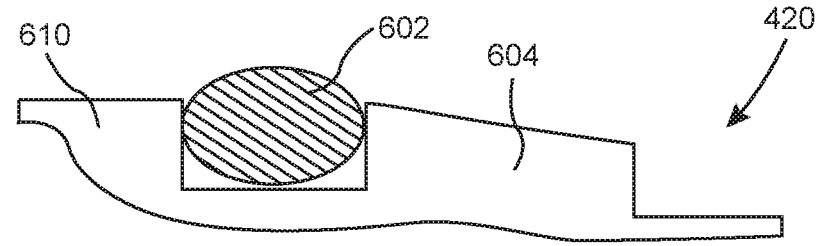
Figure 13E:
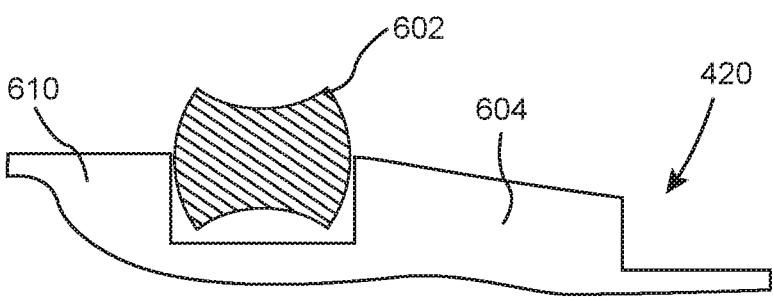

FIG. 13B shows another aspect with the metallic/composite component 602 configured as a rectangular metallic/composite rod arranged in a channel of the lower member 420. FIG. 13C shows another aspect with the metallic/composite component 602 configured as a hexagon shaped metallic/composite rod arranged in a channel of the lower member 420. FIG. 13D shows another aspect with the metallic/composite component 602 configured as an elliptical metallic/composite rod arranged in a channel of the lower member 420. FIG. 13E shows another aspect with the metallic/composite component 602 configured as a four curved sided metallic/composite rod arranged in a channel of the lower member 420.

Figure 14A:
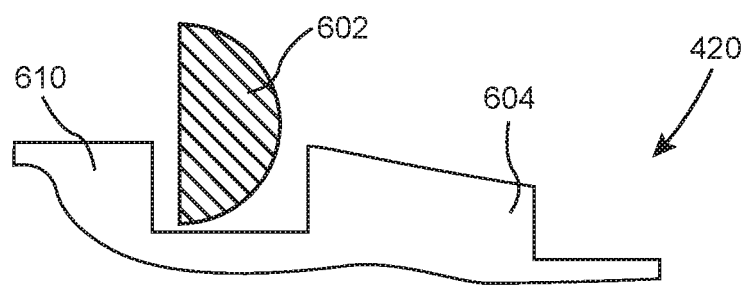
FIG. 14A, FIG. 14B, FIG. 14C, FIG. 14D, and FIG. 14E show various cross-sections of a lower member according to other aspects of the disclosure.
Figure 14B:
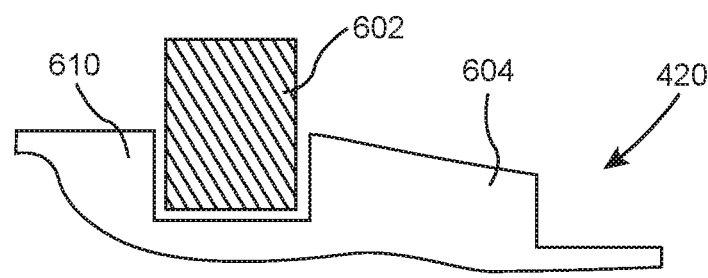
Figure 14C:
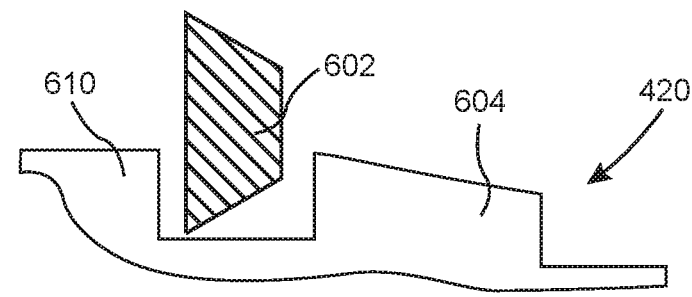
Figure 14D:
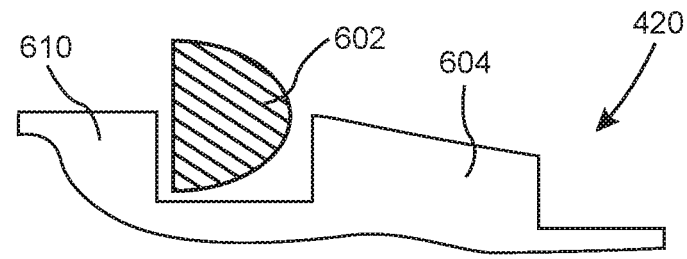
Figure 14E:
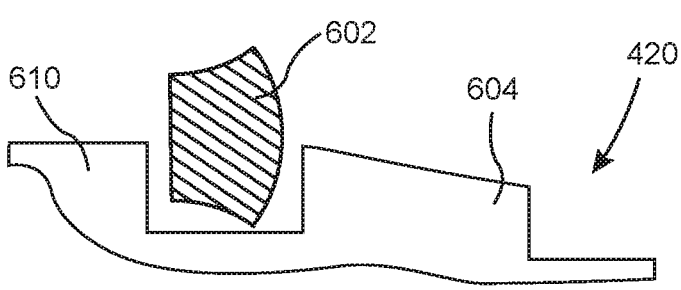

FIG. 14A, FIG. 14B, FIG. 14C, FIG. 14D, and FIG. 14E show various cross-sections of a lower member according to other aspects of the disclosure. In particular, FIG. 14A shows another aspect with the metallic/composite component 602 configured as a half circular metallic/composite rod arranged in a channel of the lower member 420. FIG. 14B shows another aspect with the metallic/composite component 602 configured as a rectangular metallic/composite rod arranged in a channel of the lower member 420. FIG. 14C shows another aspect with the metallic/composite component 602 configured as a trapezoid shaped metallic/composite rod arranged in a channel of the lower member 420. FIG. 14D shows another aspect with the metallic/composite component 602 configured as a half elliptical metallic/composite rod arranged in a channel of the lower member 420. FIG. 14E shows another aspect with the metallic/composite component 602 configured as a metallic/composite rod with a flat sided shape having three curved sides arranged in a channel of the lower member 420.

Figure 15A:
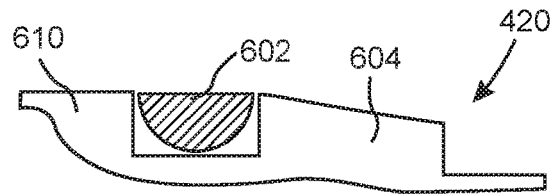
FIG. 15A, FIG. 15B, FIG. 15C, FIG. 15D, FIG. 15E, and FIG. 15F show various cross-sections of a lower member according to other aspects of the disclosure.
Figure 15E:
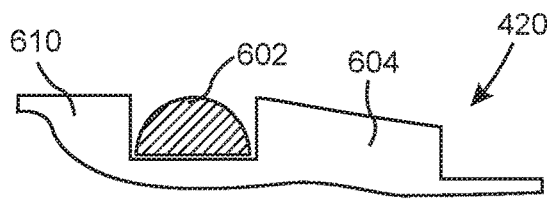
Figure 15B:
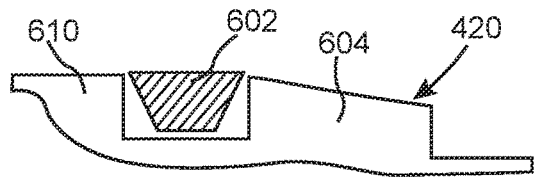
Figure 15F:
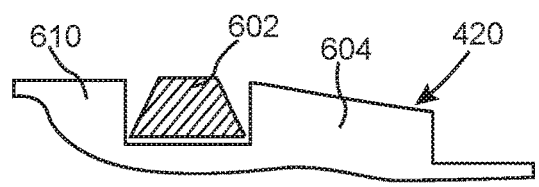
Figure 15C:
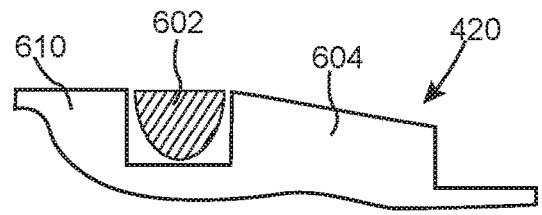
Figure 15G:
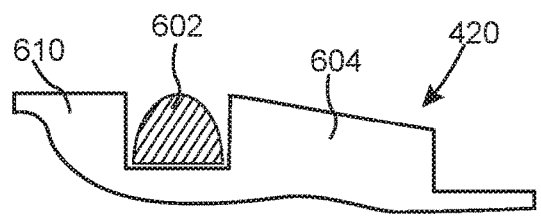
Figure 15D:
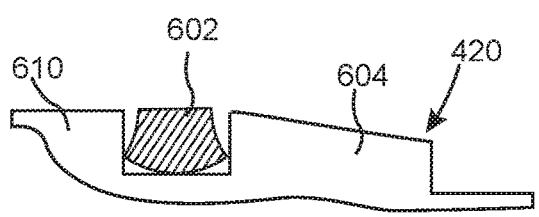
Figure 15H:
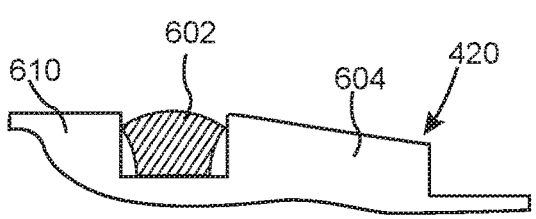
Figure 16A:
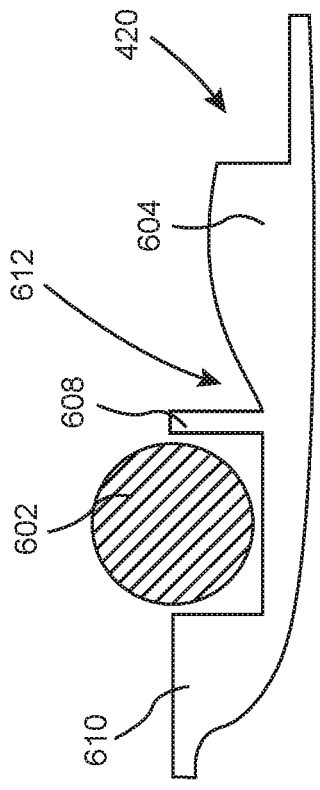
FIG. 16A, FIG. 16B, FIG. 16C, and FIG. 16D show various cross-sections of a lower member according to other aspects of the disclosure.
Figure 16C:
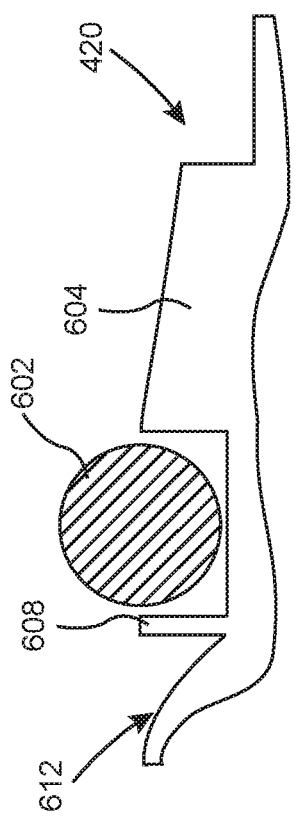
Figure 16B:
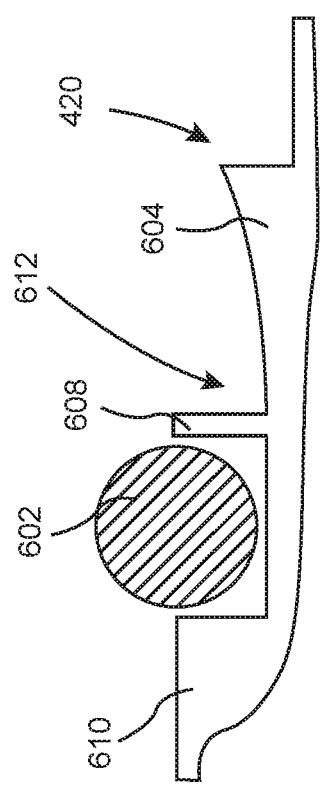
Figure 16D:
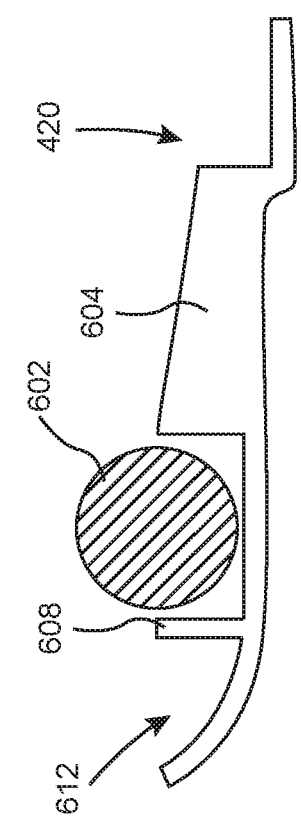

FIG. 15A, FIG. 15B, FIG. 15C, FIG. 15D, FIG. 15E, FIG. 15F, FIG. 15G, and FIG. 15H show various cross-sections of a lower member according to other aspects of the disclosure. In particular, FIG. 15A shows another aspect with the metallic/composite component 602 configured as a half circular metallic/composite rod arranged in a channel of the lower member 420 with the flat side up as shown in the Figure. FIG. 15B shows another aspect with the metallic/composite component 602 configured as a trapezoid shaped metallic/composite rod arranged in a channel of the lower member 420 with the wider side up as shown in the Figure. FIG. 15C shows another aspect with the metallic/composite component 602 configured as a half elliptical metallic/composite rod arranged in a channel of the lower member 420 with the flat side up as shown in the Figure. FIG. 15D shows another aspect with the metallic/composite component 602 configured as a metallic/composite rod with a flat top shape having three curved sides arranged in a channel of the lower member 420 with the flat side up as shown in the Figure. FIG. 15E shows another aspect with the metallic/composite component 602 configured as a half circular metallic/composite rod arranged in a channel of the lower member 420 with the flat side down as shown in the Figure. FIG. 15F shows another aspect with the metallic/composite component 602 configured as a trapezoid shaped metallic/composite rod arranged in a channel of the lower member 420 with the wider side down as shown in the Figure. FIG. 15G shows another aspect with the metallic/composite component 602 configured as a half elliptical metallic/composite rod arranged in a channel of the lower member 420 with the flat side down as shown in the Figure. FIG. 15H shows another aspect with the metallic/composite component 602 configured as a metallic/composite rod with a flat bottomed shape having three curved sides arranged in a channel of the lower member 420 with the flat side up as shown in the Figure.

FIG. 16A, FIG. 16B, FIG. 16C, and FIG. 16D show various cross-sections of a lower member according to other aspects of the disclosure. In particular, FIGS. 16A, 16B, 16C, and 16D show various structural arrangements that include the metallic/composite component 602 configured as a metallic/composite rod arranged in a channel of the lower member 420. During manufacturing, the plastic portion of the lower member 420 is over molded around the metallic/composite component 602 configured as a circular metallic/composite rod. The lower member 420 may further include various arrangements of a strengthening structure 604 to provide additional strength to the lower member 420, a rib structure 608 to provide additional strength to the lower member 420, an additional area of thickness 610 to provide additional strength to the lower member 420, and open sections 612 to reduce weight of the lower member 420.

The process of constructing the lower member 420 may utilize any known molding technology. In a particular aspect, the process of constructing the lower member 420 may utilize any known polypropylene molding technology. The process may include arranging the metallic/composite component 602 in preparation for molding the lower member 420 such that the metallic/composite component may extend along a width of the lower member. This may include arranging the metallic/composite component within a mold prior to molding. Before arranging or after arranging, the metallic/composite component 602 may be configured to attach to a front end module of the vehicle as described above. Thereafter, a plastic portion may be over molded with respect to the metallic/composite component 602. During the molding process, the lower member 402 may have the strengthening structures 604, open sections 612, and rib structures 608 formed adjacent the metallic/composite member in the plastic portion.

EXAMPLES

Example 1

A hybrid/composite lower member system was constructed consistent with the disclosure to replace an existing steel spoiler solution. The existing steel spoiler solution had a mass of approximately 3.1 kg. The hybrid/composite lower member system constructed consistent with the disclosure had a mass of approximately 2 kg (approximate 1 kg of plastic filled resin and 1 kg of steel). This resulted in more than 1 kg weight savings for the vehicle, which is at least a 30% reduction in weight. A similar percentage of weight reduction would be achieved in other constructions. Moreover, the hybrid/composite lower member system was constructed consistent with the disclosure resulted in beneficial part integrations. Additionally, the hybrid/composite lower member system constructed consistent with the disclosure resulted in reduced manufacturing complexity, reduced manufacturing time, and had a cost comparable to the conventional steel spoiler. Finally, as discussed above, the hybrid/composite lower member system was constructed consistent with the disclosure had favorable performance with respect to rotation of leg during lower-leg impact tests.

EXAMPLES

Example 1

A lower member device comprising: a metallic/composite component extending substantially along a width of the lower member; the metallic/composite component is configured to attach to a front end module of the vehicle; a plastic portion over molded on the metallic/composite component; and the plastic portion further comprises strengthening portions arranged adjacent the metallic/composite member.

Example 2

The device of Example 1, wherein the metallic/composite component is configured to be mechanically fastened to end supports extending from the front end module of the vehicle with mechanical fasteners.

Example 3

The device of any one of Examples 1-2, wherein the metallic/composite component comprises a hollow non-polygonal cross-section.

Example 4

The device of any one of Examples 1-3, wherein the metallic/composite component comprises a metallic/composite rod.

Example 5

The device of any one of Examples 1-2, wherein the metallic/composite component comprises a rod having a polygonal cross-section.

Example 6

The device of any one of Examples 1-2, wherein the metallic/composite component comprises a rod having a non-polygonal cross-section.

Example 7

The device of any one of Examples 1-6, wherein the strengthening portions comprise ribs.

Example 8

The device of any one of Examples 1-6, wherein the strengthening portions comprise rectangular shaped portions.

Example 9

The device of any one of Examples 1-6, wherein the strengthening portions comprise trapezoidal shaped portions.

Example 10

The device of any one of Examples 1-6, wherein the plastic portion comprises a smooth outer exposed surface.

Example 11

The device of any one of Examples 1-10, wherein the mechanical fasteners comprise C clamps.

Example 12

A vehicle comprising the lower member of any one of Examples 1-11 and further comprising: a radiator; an engine compartment; and an energy absorbing system comprising an energy absorber.

Example 13

The vehicle of Example 12, further comprising a bumper beam, wherein the energy absorber extends parallel to the bumper beam.

Example 14

A method of constructing a lower member device comprising: arranging a metallic/composite component in preparation for molding the lower member such that the metallic/composite component will extend along a width of the lower member; configuring the metallic/composite component to attach to a front end module of the vehicle; molding a plastic portion over the metallic/composite component; and forming strengthening portions arranged adjacent the metallic/composite member in the plastic portion.

Example 15

The method of Example 14, further comprising configuring the metallic/composite component to be mechanically fastened to end supports extending from the front end module of the vehicle with mechanical fasteners.

Example 16

The method of any one of Examples 14-15, wherein the metallic/composite component comprises a hollow non-polygonal cross-section.

Example 17

The method of any one of Examples 14-15, wherein the metallic/composite component comprises a metallic/composite rod.

Example 18

The method of any one of Examples 14-15, wherein the metallic/composite component comprises a rod having a polygonal cross-section.

Example 19

The method of any one of Examples 14-15, wherein the metallic/composite component comprises a rod having a non-polygonal cross-section.

Example 20

The method of any one of Examples 14-19, wherein the strengthening portions comprise ribs.

Example 21

The method of any one of Examples 14-19, wherein the strengthening portions comprise rectangular shaped portions.

Example 22

The method of any one of Examples 14-19, wherein the strengthening portions comprise trapezoidal shaped portions.

Example 23

The method of any one of Examples 14-19, wherein the plastic portion further comprises ribs.

Example 24

The method of any one of Examples 14-23, wherein the plastic portion comprises a smooth outer exposed surface.

Example 25

The method of Examples 14-24, wherein the mechanical fasteners comprise C clamps.

In one aspect, the lower member 420 may be constructed with filled polypropylene (PP) and a steel reinforcement component. However, the lower member 420 may include any thermoplastic material or combination of thermoplastic materials with another material (e.g., with elastomeric materials and/or thermoset materials), such as a filled thermoplastic polyolefin (TPO). Possible thermoplastic materials include polybutylene terephthalate (PBT); acrylonitrile-butadiene-styrene (ABS); polycarbonate; polycarbonate/PBT blends; polycarbonate/ABS blends; copolycarbonatepolyesters; acrylic-styrene-acrylonitrile (ASA); acrylonitrile-(ethylene-polypropylene diamine modified)-styrene (AES); phenylene ether resins; blends of polyphenylene ether/polyamide; polyamides; phenylene sulfide resins; polyvinyl chloride PVC; high impact polystyrene (HIPS); low/high density polyethylene (L/HDPE); expanded polypropylene (EPP); and thermoplastic olefins (TPO), as well as filled (e.g., glass filled) materials of above resins. For example, a lower member and, optionally the energy absorber, comprise Xenoy™ resin, which is commercially available from SABIC Innovative Plastics IP B.V. An exemplary filled resin is STAMAX™ resin, which is a long glass fiber filled polypropylene resin also commercially available from SABIC Innovative Plastics IP B.V. The bumper beam and/or energy absorber can also be formed from combinations comprising at least one of any of the above-described materials.

As described above, the disclosure provides a hybrid/composite energy-absorbing lower member for automobiles with plastics over molded on at least one metal component having a simplified construction, improved pedestrian safety, and reduced weight. Moreover, the disclosure provides a method of making a hybrid/composite energy-absorbing lower member having a simplified construction, improved pedestrian safety, and reduced weight.

While the disclosure has been described in terms of exemplary aspects, those skilled in the art will recognize that the disclosure can be practiced with modifications in the spirit and scope of the appended claims. These examples given above are merely illustrative and are not meant to be an exhaustive list of all possible designs, aspects, applications or modifications of the disclosure.

What is claimed is:

1. A hybrid metal plastic undertray to couple to a front end module of a vehicle via attachments extending below a bumper beam of the vehicle, the hybrid metal plastic undertray
   comprising:
   a metallic/composite component that is elongate and that extends substantially along a width of the vehicle,
   the metallic/composite component comprising attachment portions configured to attach to the front-end module of the vehicle via the attachments; and
   a plastic portion that is also elongate and that also extends the width of the vehicle, the plastic portion being partially over molded around the metallic/composite component, the plastic portion comprising:
   a channel also extending the width of the vehicle, with the metallic/composite component arranged in the channel, with
   the plastic portion being over molded around the metallic/composite component; and
   a plurality of strengthening portions arranged adjacent the metallic/composite component, the strengthening portions over molded on the metallic/composite component,
   wherein the metallic/composite component and plastic portion are selected to exhibit reduced knee rotation in pedestrian vehicle impacts at 10 milliseconds versus a conventional steel spoiler and a pure plastic undertray, and
   wherein the hybrid metal plastic undertray has a lower mass than the conventional steel spoiler.

2. The device of claim 1, wherein the attachment portions of the metallic/composite component are configured to be mechanically fastened to end supports extending from the front-end module of the vehicle.

3. The device of claim 1, wherein the metallic/composite component is configured to attach to the front-end module of the vehicle in at least two locations.

4. The device of claim 1, wherein the metallic/composite component comprises a hollow metallic/composite pipe.

5. The device of claim 1, wherein the metallic/composite component comprises a metallic/composite channel.

6. The device of claim 1, wherein the metallic/composite component comprises a hollow polygonal cross-section.

7. The device of claim 1, wherein the plastic portion comprises a polypropylene, a polycarbonate-polybutylene terephthalate blend, a polycarbonate-polyethylene terephthalate blend, or a combination thereof.

8. The device of claim 7, wherein the plastic portion comprises polypropylene.

9. The device of claim 8, wherein the polypropylene comprises a long glass fiber filled polypropylene.

10. The device of claim 1, wherein undertray exhibits at least a 30% weight reduction in comparison to a conventional steel spoiler consisting essentially of the same components, but formed from steel.

11. The device of claim 1, wherein the undertray at least partially surrounds the metallic/composite component.

12. The device of claim 1, wherein the metallic/composite component comprises a rod.

13. The device of claim 1, wherein the undertray may include a smooth exposed paintable outer surface.

14. The device of claim 1, wherein the undertray further includes open sections between the strengthening structures to reduce weight of the lower member.

15. The device of claim 1, wherein the undertray further includes a rib structure to provide additional strength to the lower member.

16. The device of claim 1, wherein the undertray constructed with a filled polypropylene and a steel reinforcement component.

17. The device of claim 1, wherein the metallic/composite component comprises a hollow non-polygonal cross-section.

18. A method of constructing a hybrid metal plastic undertray to couple to a front end module of a vehicle via attachments extending below a bumper beam of the vehicle, the hybrid metal plastic undertray comprising:
    arranging a metallic/composite component in a mold in preparation for molding a plastic portion around the metallic/composite component such that the metallic/composite component will extend along a width of the plastic portion and a width of the vehicle;
    configuring the metallic/composite component to attach to a front-end module of a vehicle with attachment portions via the attachments;
    molding the plastic portion over the metallic/composite component, comprising:
    molding a channel extending the width of the vehicle, with the metallic/composite component arranged in the channel;
    molding the plastic portion around the metallic/composite component; and
    forming strengthening portions arranged adjacent the metallic/composite component in the plastic portion during molding, with the strengthening portions over molded on the metallic/composite component,
    wherein the metallic/composite component and plastic portion are selected to exhibit reduced knee rotation in pedestrian vehicle impacts at 10 milliseconds versus a conventional steel spoiler and a pure plastic undertray, and wherein the hybrid metal plastic undertray is molded such that it has a lower mass than the conventional steel spoiler.

19. The method of claim 18, further comprising configuring the metallic/composite component to be mechanically fastened to end supports extending from the front-end module of the vehicle.

20. The method of claim 18, further comprising configuring the metallic/composite component to attach to the front-end module of the vehicle to at least two locations.

21. The method of claim 18, wherein the metallic/composite component comprises a hollow metallic/composite pipe.

22. The method of claim 18, wherein the metallic/composite component comprises a metallic/composite channel.

23. The method of claim 18, wherein the metallic/composite component comprises a hollow polygonal cross-section.

24. The method of claim 18, wherein the plastic portion comprises polypropylene.

25. The method of claim 18, wherein the undertray exhibits at least a 30% weight reduction in comparison to a conventional steel spoiler.

26. The method of claim 18, wherein the undertray exhibits superior performance in pedestrian vehicle impacts during certain time frames in comparison to a conventional steel spoiler at least with respect to knee rotation.

27. The method of claim 18, wherein the undertray exhibits superior performance in pedestrian vehicle impacts in comparison to a conventional all plastic lower member at least with respect to knee rotation.

28. A front-end module device for a vehicle, the front-end module device comprising:
   a bumper beam;
   attachments coupled to the bumper beam; and
   a hybrid metal plastic undertray coupled to the attachments under the bumper beam, the hybrid metal plastic undertray comprising:
      a metallic/composite component that is elongate and that extends substantially along a width of the vehicle, the metallic/composite component comprising attachment portions configured to attach to the front-end module of the vehicle via the attachments; and
      a plastic portion that is also elongate and that also extends the width of the vehicle, the plastic portion being partially over molded around the metallic/composite component, the plastic portion comprising:
         a channel also extending the width of the vehicle, with the metallic/composite component arranged in the channel, with the plastic portion being over molded around the metallic/composite component; and
         a plurality of strengthening portions arranged adjacent the metallic/composite component, the strengthening portions over molded on the metallic/composite component,
      wherein the metallic/composite component and plastic portion are selected to exhibit reduced knee rotation in pedestrian vehicle impacts at 10 milliseconds versus a conventional steel spoiler and a pure plastic undertray, and
   wherein the hybrid metal plastic undertray has a lower mass than the conventional steel spoiler.

29. The device of claim 28, wherein the attachment portions of the metallic/composite component are configured to be mechanically fastened to end supports extending from the front-end module of the vehicle.

30. The device of claim 28, wherein the metallic/composite component is configured to attach to the front-end module of the vehicle in at least two locations.

31. The device of claim 28, wherein the metallic/composite component comprises a hollow polygonal cross-section.

32. The device of claim 28, wherein the plastic portion comprises a polypropylene, a polycarbonate-polybutylene terephthalate blend, a polycarbonate-polyethylene terephthalate blend, or a combination thereof.

33. The device of claim 28, wherein the undertray exhibits at least a 30% weight reduction in comparison to a conventional steel spoiler consisting essentially of the same components, but formed from steel.

* * * * *